Sept. 17, 1968 K. J. MUTTER 3,402,118
APPARATUS FOR ELECTROPHORETIC SEPARATION
Filed Dec. 9, 1964
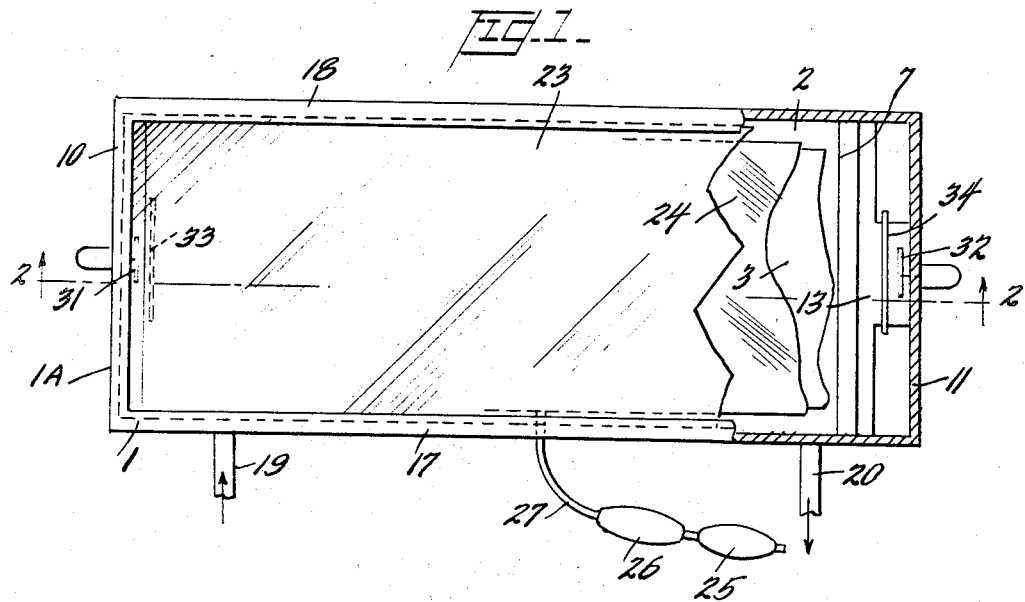
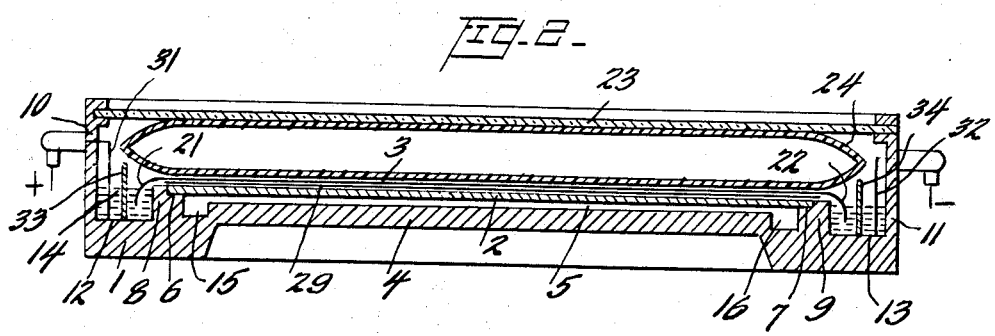
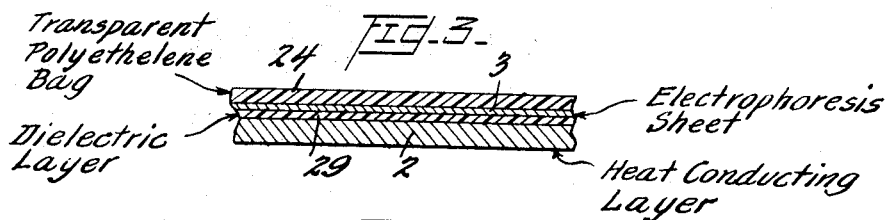
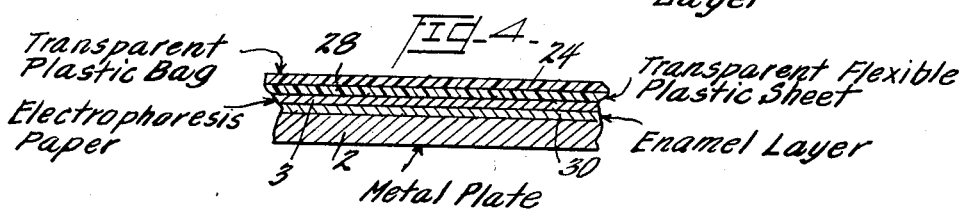

United States Patent Office 3,402,118
Patented Sept. 17, 1968

3,402,118
APPARATUS FOR ELECTROPHORETIC
SEPARATION
Karl J. Mutter, Birsfelden, Basel-Land, Switzerland, assignor to Camag, Chemie-Erzeugnisse und Adsorptionstechnik AG, Muttenz, Switzerland, a corporation of Switzerland
Filed Dec. 9, 1964, Ser. No. 417,050
7 Claims. (Cl. 204—299)

ABSTRACT OF THE DISCLOSURE

Improvements are provided in apparatus for electrophoretic separation, particularly under high voltage. A system is employed preferably with the use of controlled, uniform pressure, providing optimum heat transfer, and prevention of losses by evaporation of conductive fluid from an electrophoretic medium. Separation of low molecular weight substances is made possible by use of the higher voltages.

---

The present invention relates to improvements in electrophoretic separation and in apparatus for such separation. More particularly, it relates to high voltage electrophoresis and improvements in apparatus arrangements for conducting the same.

Electrophoresis has become widely useful in analytical procedures. Generally, a porous sheet, such as fiber paper, is moistened or impregnated with a buffer solution which is an electrically conductive fluid in which ionographic migration is effected in the analysis of a variety of substances, and the components thereof are rendered visible on the paper.

The current (D.C.) that flows through the buffer solution in the paper, causes evolution of heat. In electrophoresis with low voltage (mostly below 500 volts) or with field intensities normally lower than 10 volts/cm., the joulean heat evolved and vaporization of liquid from the buffer solution is not considered greatly significant. With higher voltages, or with field intensities higher than 10 to 20 volts/cm., the generated heat is of a magnitude that is important, and it must be dissipated or led away.

There are certain prior, known means that may be employed for conducting heat away from the paper. It is possible to carry out the electrophoresis under a liquid immiscible with water. The liquid takes up the generated heat which is transferred to a heat exchanger. One of the disadvantages of such a system is that certain substances separated in the electrophoresis may be soluble in the liquid, thereby interfering with the analysis. Another possible means is the laying of the paper on a cooled plate, or placement of the paper between two cooled plates. Satisfactory results have not been obtained with these known means.

In the present invention, a so called dry system is employed, as distinct from the above known method in which a liquid is used in contact with the paper to remove heat therefrom. The porous sheet, usually paper, in which the electrophoretic separation is effected, is subjected to controlled, uniform pressure throughout, on a substantially flat, efficiently cooled, heat conducting support by means of an inflatable bag which covers the sheet, as shown in the arrangements described and claimed hereinbelow. Optimum heat transfer from the sheet to the support is thereby assured, and, more uniform results and more exact duplication of such results in analysis are obtainable.

Arrangements of structures are illustrated in the accompanying drawing, to some extent diagrammatic, in which, FIG. 1 is a top plan view of an apparatus or a cell for conducting electrophoretic separation;

FIG. 2 is a vertical sectional view on line 2—2 of the apparatus in FIG. 1;

FIG. 3 is an enlarged fragmentary view of a section of an arrangement of parts to show the relative position of the inflatable bag and conventional electrophoresis paper; and FIG. 4 is a view, similar to that in FIG. 3, showing a preferred arrangement of parts.

Like reference characters indicate like parts in the above figures.

Referring to FIGS. 1 and 2, a rectangular case or cell 1, may be set in an outer case, not shown, and may be a plastic cast or other suitable material. The cell 1 is provided with a substantially flat plate 2, of metal, such as aluminum, or other material with a relatively high thermal conductivity. The plate 2 serves as a heat-conducting support for a porous sheet 3, such as filter paper or any other suitable porous sheet material which is impregnated with an electrically conductive fluid, such as a socalled buffer solution. An agar-agar layer has been used in place of paper.

The heat-conducting support 2 extends lengthwise of the cell 1, spaced slightly from the bottom 4 thereof, so that a narrow slit 5 is formed for the purpose to be described. The opposite ends 6 and 7 of the support 2 are seated respectively on raised portions 8 and 9 of the cast cell 1 spaced respectively from the end walls 10 and 11 thereof to form troughs 12 and 13 for the buffer solution 14.

Beneath the heat-conducting support 2, adjacent the ends 6 and 7 thereof, are respectively channels or grooves 15 and 16 in the cast cell 1. The channels 15 and 16 extend substantially across the ends of the support 2 to the side walls 17 and 18 of the cell 1. The channels 15 and 16 are inter-connected by the narrow slit 5 through which a cooling fluid is passed in either direction. Pipe connections 19 and 20 to the respective channels 15 and 16 serve as means in the continuous circulation of cooling fluid through the slit 5 in contact with substantially the entire undersurface of the metal plate or support 2 to transfer heat therefrom.

The porous electrophoresis sheet 3 is provided at its ends adjacent the troughs 12 and 13 with current transfer flaps 21 and 22 respectively. The flaps 21 and 22, usually in the form of absorbent pads, have their free ends immersed in the buffer solution 14 in the troughs, and with the solution, they serve as means for completing the current circuit.

Between a glass plate 23 slidable in grooves in the side walls of the cell, and the electrophoresis sheet 3 is an inflatable bag 24 which, when inflated, applies pressure to the entire area of the sheet 3 supported by the heat-conducting plate 2. The area of the under side of the bag 24 preferably is greater than the area of the sheet 3 and extends beyond the edges thereof. It is important to note that the bag 24, which is made of an elastic, such as rubber, or a flexible plastic such as polyethylene, exerts a pressure that is the same throughout the contacted area of the sheet 3 regardless of the latter's surface irregularities and of any lack of uniformity in its thickness. Not only are the aforementioned advantages realized by the use of this arrangement but it also serves to prevent evaporation, or escape of vapor, from the electrically conductive fluid or buffer solution in the sheet 3.

The bag 24 and the glass plate 23 are preferably transparent, thereby making it possible to observe the progress of the electrophoretic separation on the sheet 3 during the operation of the cell.

An air pump with a pressure gauge may be used in the inflation of the bag 24. A simple, well-known combination of a pressure bulb 25 and an air sac or secondary ball 26 connected to a flexible tube 27 which in turn is connected to the bag 24, may be used as shown in FIG. 1. The proper inflation of the bag 24 at a predetermined pressure may be observed by noting the diameter of the sac 26.

A very thin, transparent plastic sheet 28 may be inserted between the bag 24 and the sheet 3, if desired, as shown in FIG. 4. This may further insure against the escape of vapor. Vaporization of the liquid in a buffer solution causes changes in concentration which results in variations in results.

It is important to provide electrical insulation between the electrophoresis sheet 3 and the support plate 2 when this is an electrical conductor, such as aluminum. Otherwise, short circuiting will occur. With an aluminum plate as a support 2, the entire upper surface of the support is covered with a layer of insulation 29, such as, a plastic, as for instance, polytetrafluoroethylene (known as Teflon), or a thin layer of glass. A metal plate with an enamel coating 30 is noted, as shown in FIG. 4. The insulation should have a high dielectric strength and yet should have a heat conductivity sufficient to serve in combination with the metal plate support to provide efficient cooling. A suitable thinness of the insulation makes this possible.

In the buffer-filled electrode troughs 12 and 13, are placed, respectively, the electrodes 31 and 32, and the diaphragms 33 and 34.

The cell 1 may be placed in a safety case, not shown, for the protection of an operator, particularly when using it in high voltage electrophoresis.

In conducting a separation, several steps are taken prior to the actual operation of a cell. Proper connections are made with the electrodes 31 and 32, and the power supply. The tap water line is connected to either pipe connection 19 or 20 and the water is turned on to run at a fairly rapid rate. Air bubbles initially in the slot 5 may be removed by raising the end of the cell once or twice nearest the outlet pipe. The troughs 12 and 13 containing respectively the diaphragms 33 and 34 are supplied with a desired volume of buffer solution of known composition.

The electrophoresis paper is marked with starting points or lines, and is impregnated with a selected buffer solution. Excess solution is removed from the paper.

Known compositions of buffer solutions used are, for instance, solutions of ionizable substances and with desired pH ranges, such as ammonium carbonate, or ammonium citrate, or veronal, or mixed acetic acid-formic acid solution, or potassium hydrogen phthalate and hydrochloric acid, or sodium phosphate with or without phosphoric acid in solution. A solution selected, depends to some extent on the substance to be subjected to electrophoretic separation and on the buffer that will give the best results.

After impregnating the electrophoretic paper with a buffer solution, the current transfer flaps 21 and 22 are impregnated with buffer solution, excess solution is removed from the flap surfaces, and the substances to be separated may be applied to the impregnated paper 3. This may be done before or after placing the paper in the cell. One edge of the flaps 21 and 22 is carefully pressed on the opposite ends of the paper 3, and the flaps are bent so that the opposite edge is below the level of the buffer solution 14 in the respective troughs 12 and 13.

If desired, a thin, flexible polyethylene sheet is placed over the paper 3 and the flaps 21 and 22 before inserting the bag 24. The tube connection 27 is pushed through an opening in a side of the cell and the bag 24 is placed in position, whereafter the glass cover 23 is slid to closed position over the bag. Connection is made through the tube 27 with an air pump, or, as shown, with the conventional pressure bulb 25 and secondary ball or reservoir sac 26 combination, having a valve therebetween that prevents back flow. By repeated squeezes of the bulb 25, the bag 24 becomes inflated with the air at a predetermined desired pressure. This can be ascertained by noting the thickness or measurement of the sac 26 at the selected prsesure. The pressure should be below that at which the glass cover 23 is apt to crack. In view of the transparency of the bag it can be observed whether the pressure has caused any excess liquid to be squeezed out on the surface of either of the flaps 21 and 22. If so, it may be adjusted. Nonuniformly impregnated paper will otherwise cause nonuniform flow of current and ultimately a disturbed pherogram. The bag 24 should also be free from wrinkles which would cause uneven pressure on the paper 3.

In the operation of the cell, the electrodes 31 and 32 having been connected to the power supply, the current is turned on at the desired voltage, and the desired rate of flow of the cooling water is maintained.

Substances composed of compounds of high molecular weight, for example, proteins, serums and ferments, are readily and successfully separated with comparatively low voltages or with the low field intensities, as indicated hereinabove. Low voltage electrophoresis, however, cannot be used satisfactorily to separate substances composed of compounds of low molecular weight, namely, amino acids, since the longer duration of low voltage electrophoresis results in diffusion and other interfering phenomena which are superimposed upon the electrophoretic migration.

Many substances besides amino acids, such as, peptides, organic acids, porphyrines, sugars, inorganic ions, having low molecular weights, are satisfactorily separated by the use of high voltage, paper electrophoresis.

By way of example, in the resolution of amino acids, such as glutamine, serine, glycine, a-alanine, and methionine, electrophoresis is carried out at 4600 volts and 55 ma., in twenty minutes, using a buffer of pH 2 consisting of 5% formic acid, 15% acetic acid, and 80% water. It is noted that little or no diffusion occurs.

The velocity of electrophoretic migration is in direct proportion to the voltage applied, or, in other words, to the electric field intensity (v./cm.). The quantity of heat which can be transmitted from the electrophoretic paper or sheet to the cooling system determines the maximum voltage.

The electrophoresis cell described, is operable at voltages up to substantially 5000 volts, and the current passage may be raised to provide substantially 800 watts. The paper width may be as much as up to substantially 200 mm., and the length as much as up to substantially 400 mm. The electric field intensity may be raised up to substantially 125 volts/cm.

A number of advantages have been realized in the use of the cell described. It is compact, easy to handle, and can be operated with safety. The electropherogram can be observed during a run. No liquid cooling medium is present which can cause elution of substances subjected to electrophoresis. Sheets as well as strips can be used. Thin-layer electrophoresis can be conducted. Two-dimensional as well as one-dimensional work is within the range of this cell.

What is claimed is:

1. In an apparatus for electrophoretic separation on a porous sheet impregnated with an electrically conductive fluid containing dissolved ionizable material, a substantially flat, heat-conducting support for a said porous sheet, and an inflatable bag for covering said sheet positioned between said bag and a surface of said support for uniformly applying pressure to said sheet and for preventing escape of vapor from said fluid.

2. In an apparatus for electrophoretic separation, according to claim 1, in which an insulating layer with relatively low resistance to heat transfer is positioned between the said surface of said heat conducting support and said bag and whereby a said porous sheet may be placed between said bag and said insulating layer.

3. In an apparatus for electrophoretic separation, according to claim 2, in which the insulating layer is a plastic film.

4. In an apparatus for electrophoretic separation, according to claim 2, in which the insulating layer is an enamel coating on said surface of said heat-conducting support.

5. In an apparatus for electrophoretic separation, according to claim 1, in which the said heat-conducting support is a metal plate, and the said plate has means for maintaining a flow of cooling fluid in a narrow slit in contact with the opposing surface of said plate.

6. In an apparatus for electrophoretic separation, according to claim 1, in which the inflatable bag is transparent, and through which a said porous sheet is rendered visible.

7. In an apparatus for electrophoretic separation on a paper sheet impregnated with an electrically conductive fluid, containing dissolved ionizable material, a flat metal plate for supporting a said paper sheet, means for maintaining a flow of cooling fluid in a narrow slit in contact with the opposing surface of said plate, a transparent, inflatable bag for covering a said sheet for uniformly applying pressure to a said sheet and for preventing escape of vapor from said electrically conductive fluid, an insulating layer with low resistance to heat transfer positioned between the said bag and the supporting surface of said plate and whereby a said paper sheet may be placed between said bag and said insulating layer, and an outer transparent, restraining wall for maintaining the pressure of said bag against a said sheet, and adapted to render a sheet visible through said wall and bag.

References Cited

UNITED STATES PATENTS

| | | | |
|---|---|---|---|
| Re. 24,752 | 12/1959 | Ressler | 204—180 |
| 3,047,489 | 7/1962 | Raymond | 204—180 |

OTHER REFERENCES

Franglen et al., "An Apparatus for Paper Electrophoresis," J. Clinical Path., vol. 8, 144, 1955, pp. 144–149.

HOWARD S. WILLIAMS, *Primary Examiner.*

E. ZAGARELLA, *Assistant Examiner.*